March 12, 1968 A. J. ARSENAULT 3,372,510
FISHING ROD HANDLING DEVICE
Filed Aug. 13, 1965 3 Sheets-Sheet 1
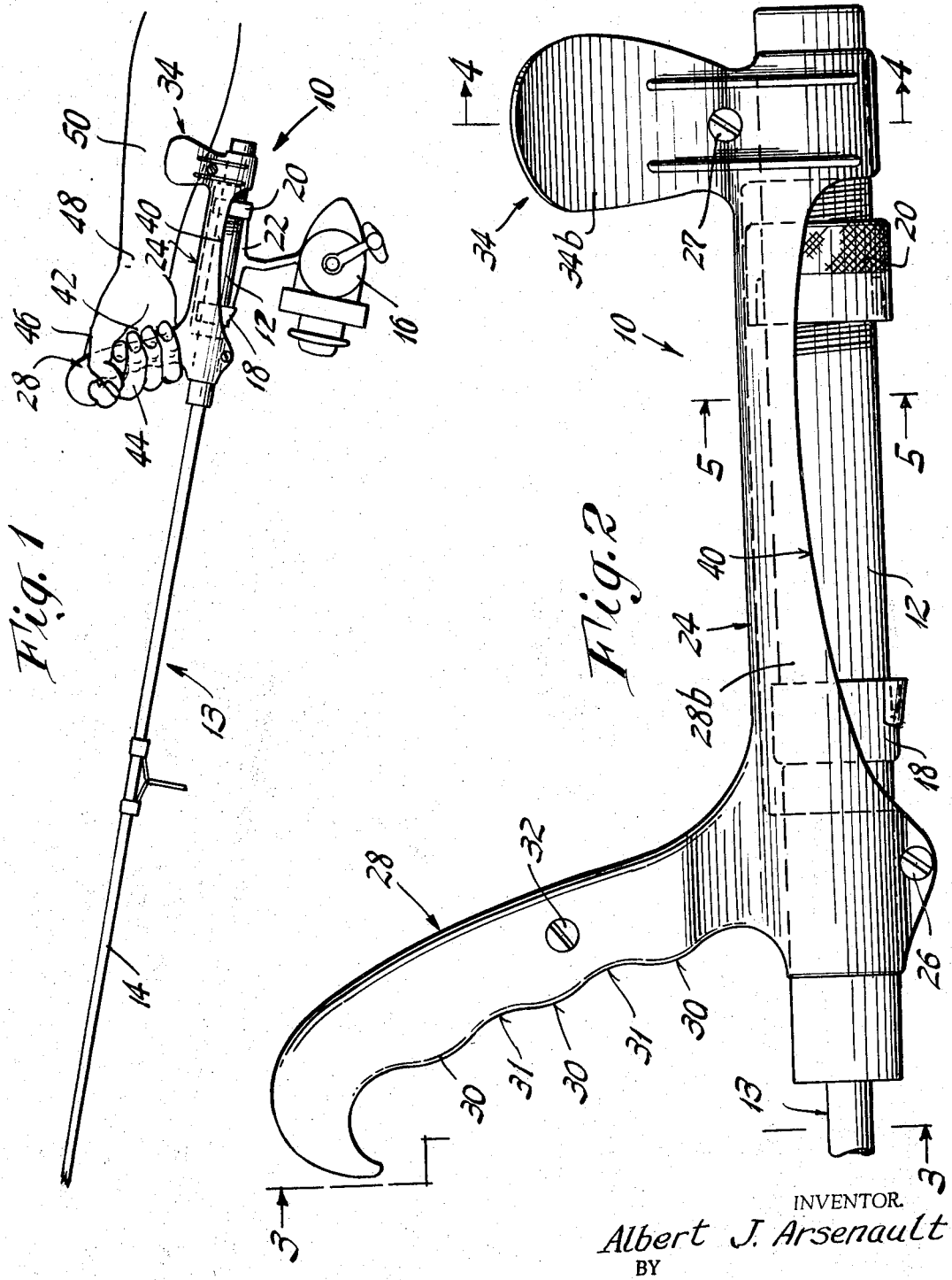
INVENTOR.
Albert J. Arsenault
BY
Johnson and Kline
ATTORNEYS March 12, 1968     A. J. ARSENAULT     3,372,510
FISHING ROD HANDLING DEVICE
Filed Aug. 13, 1965     3 Sheets-Sheet 2
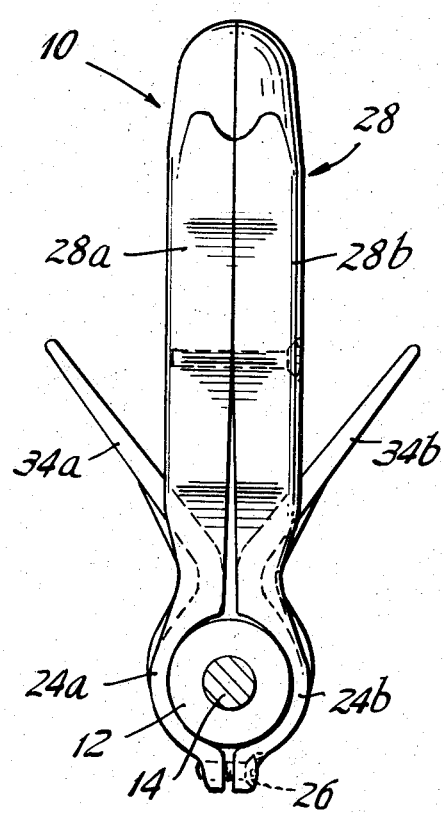
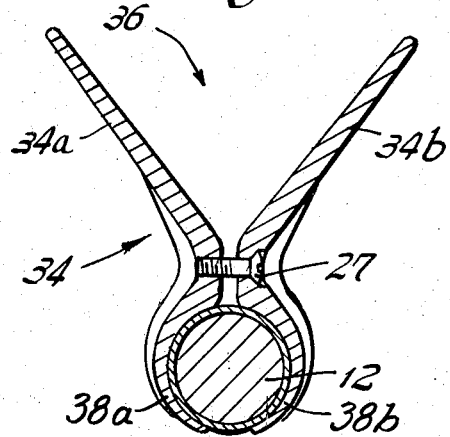
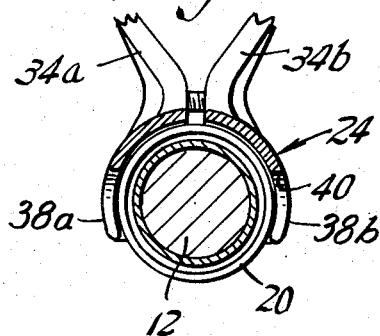
INVENTOR.
Albert J. Arsenault
BY
Johnson and Kline
ATTORNEYS March 12, 1968 — A. J. ARSENAULT — 3,372,510
FISHING ROD HANDLING DEVICE
Filed Aug. 13, 1965 — 3 Sheets-Sheet 3
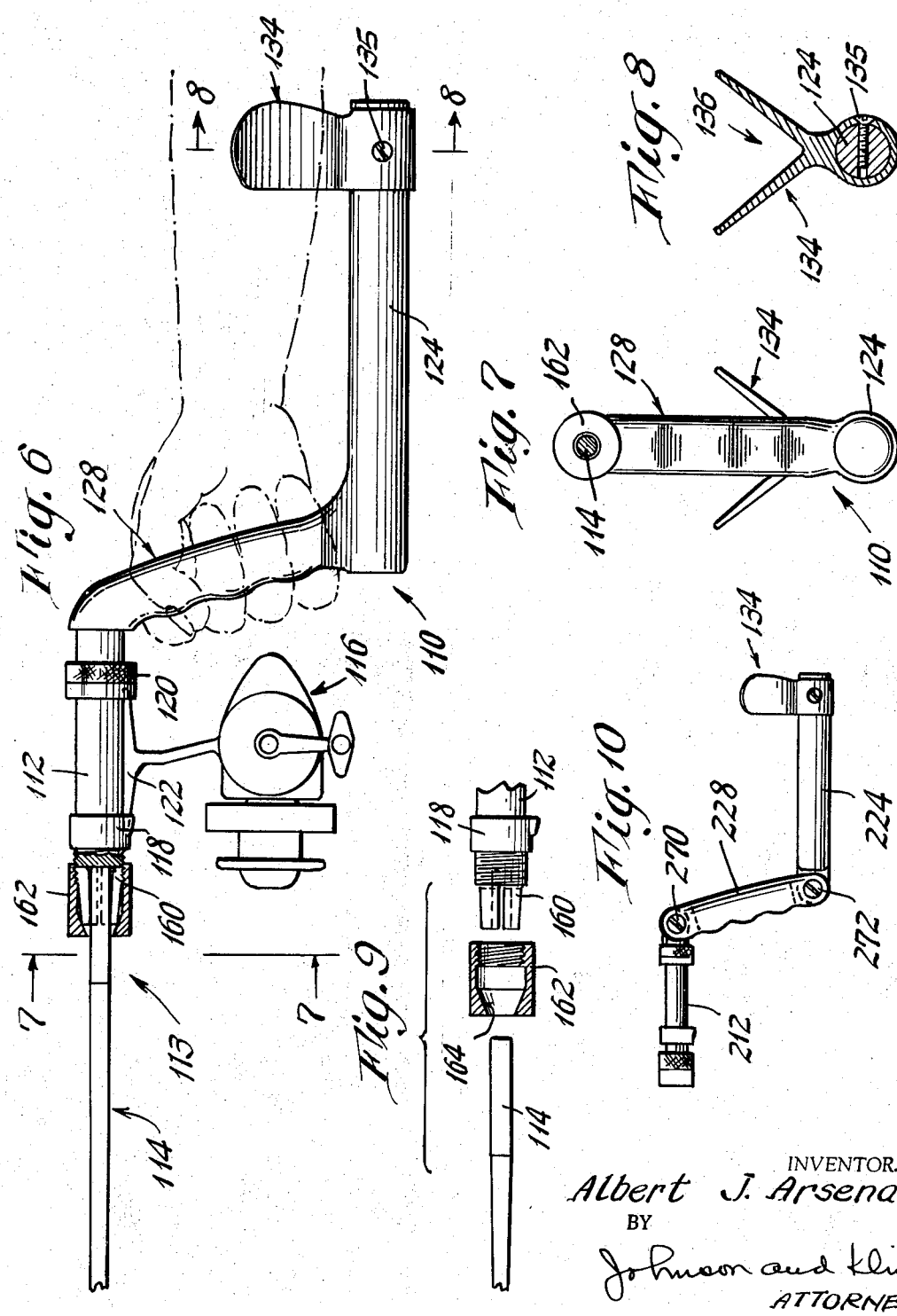
INVENTOR.
Albert J. Arsenault
BY
Johnson and Kline
ATTORNEYS

# United States Patent Office 3,372,510
Patented Mar. 12, 1968

3,372,510
FISHING ROD HANDLING DEVICE
Albert J. Arsenault, 430 Albert Ave.,
Stratford, Conn. 06497
Filed Aug. 13, 1965, Ser. No. 479,583
3 Claims. (Cl. 43—21.2)

ABSTRACT OF THE DISCLOSURE

A handling device for fishing rods comprising a split sleeve which embraces and is releasably clamped to the handle of the rod and carries at opposite ends respectively upstanding hand grip and arm support portions and has a downwardly opening recess to expose therethrough, for manual access, conventional means on the rod handle for securing a reel to the underside of the rod handle, the hand grip and arm support portions each being formed of half sections integrally connected to corresponding half sections of the split sleeve.

---

This invention relates generally to improvements in fishing equipment. More particularly, it relates to a handling device for use with a fishing rod, preferably of the casting type, to facilitate single-handed manipulation of the rod in all movements thereof usually associated with casting, hooking and reeling in a fish.

It is a principal object of this invention to provide a fishing rod handling device which permits the user to manipulate the rod in the above manner while maintaining his forearm, wrist and hand in substantial parallelism with the axis of the rod, while still permitting a snap action to be imparted to the rod by the user's wrist for casting purposes if so desired.

This is achieved in the present invention by the provision of a hand grip and an arm support disposed in spaced relationship in the axial direction of the rod, and being interconnected by an elongate body portion. The device may be connected to the conventional handle of the rod or formed as an integral part of the rod handle. The hand grip, disposed adjacent the forward end of the body portion projects radially upwardly and lies in the vertical plane of swinging movement of the rod, the direction of upward projection of the hand grip being such that the palm and fingers of the user may encircle the hand grip while the forearm, wrist and hand of the user are disposed in substantial parallelism with the axis of the rod. The arm support is disposed adjacent the rear end of the body portion and forms an upwardly opening yoke or bifurcated brace shaped to receive and partially embrace the undersurface of the forearm of the user and positioned to be continuously urged thereagainst by an upward force about the user's hand as a pivot point and in response to the weight of the rod or a downward pull on the forward end of the rod, thereby preventing the rear end of the rod from slipping off the user's arm while the user's forearm, wrist and hand are maintained in the aforementioned parallelism with the axis of the rod.

Heretofore known arm supports and handling devices for fishing rods have been found to be inadequate to meet the objects and provide the advantages of this invention. Firstly, they are unwieldy in that they require the usual uncomfortable twist or bending of the wrist associated with grasping of the conventional rod handle while the rod is disposed parallel to the arm, the only position in which the rod can be disposed for proper fishing with the end of the rod braced to, or supported by, the arm of the user. Also, they have been found, in some instances, to require additional supports, such as a socket for the rear end of the rod, or to be improperly designed to provide a proper support in relation to the movements and forces applied to the rod during the different manipulations thereof associated with normal use.

Other objects of the invention are to provide a fishing rod holding and manipulating device which overcomes the foregoing and other disadvantages of prior art devices, which is compact and highly efficient to use, which is easily installed on any conventional rod if made as an attachment thereto or which may removably accommodate a variety of shafts to an integral holding device and reel supporting rod handle, which has provision for adjustment of the upward disposition of the hand grip, and which is economical to manufacture and maintain.

Preferred embodiments of the present invention are shown in the accompanying drawings in which:

FIGURE 1 is a fragmentary pictorial view of one embodiment of the device of this invention applied to a conventional fishing rod of the casting type;

FIG. 2 is a side view on an enlarged scale of the device of FIG. 1;

FIGS. 3, 4, and 5 are sectional views respectively on the lines 3—3, 4—4, and 5—5 of FIG. 2;

FIG. 6 is a view similar to FIG. 1 of another embodiment of the invention;

FIGS. 7 and 8 are sectional views respectively on the lines 7—7 and 8—8 of FIG. 6;

FIG. 9 is a fragmentary exploded view of a portion of the embodiment of FIG. 6; and FIG. 10 is a side view of a feature of the invention.

Referring now to FIGS. 1–5, one embodiment of the present invention is seen to comprise a holding and manipulating device generally designated by the reference numeral 10 which is adapted to be attached to the handle 12 of a fishing rod 13, the rod also having a shaft 14 and a reel 16. The reel 16 is attached to the rod 13 either adjacent to or on the handle 12 in known manner by a fixed clamping sleeve 18 and a movable clamping sleeve 20 threadedly engaged with the rod 13, the sleeves 18 and 20 engaging a bracket 22 supporting the reel 16.

Referring to FIG. 2, the device 10 comprises an elongate body portion 24 which, as best seen in FIGS. 3–5, is formed as a split sleeve having half sections 24a and 24b. The sleeve is adapted to surround the handle 12 of the rod and be releasably secured thereto by any suitable means such as the screws 26 and 27.

The device 10 is provided with a hand grip 28 having a plurality of ridges 30 which define therebetween finger engaging recesses 31. The hand grip 28 extends generally upwardly from the body portion 24 and lies in a vertical plane through which the rod 13 is swung during normal fishing manipulations, as is well known in the art. The hand grip 28 also has a slight forward inclination relative to the axis of the rod to facilitate grasping thereof in a manner hereinafter more fully described. As best seen in FIG. 3, the hand grip is also formed as a pair of half sections 28a and 28b, which are formed integrally with the corresponding half sections 24a and 24b of the body portion 24. A screw 32 or other suitable means serves to hold the sections of the hand grip together.

An arm support or bifurcated brace 34 is disposed adjacent the rear end of the body portion 24 and, as best seen in FIG. 4, comprises a pair of support sections 34a and 34b which define an upwardly opening yoke providing an arm receiving recess 36. The sections 34a and 34b of the support are formed integrally with the corresponding sections 24a and 24b of the body portion, and have ear portions 38a and 38b extending around the rod handle 12 for a major portion of the circumference of the latter so as to securely grip the rod handle when joined together in cooperation with the screw 27.

The sections of the body portion 24 of the embodiment illustrated in FIG. 2 have portions cut away to conjointly define a downwardly opening recess 40 extending over a major portion of the length of the body portion in order to provide manual access to the reel clamping sleeves 18 and 20 to facilitate connection and disconnection of the reel 16 without disturbing the position of the holding device on the rod 13.

It will be seen from FIGS. 1 and 2 that the upwardly projecting angular disposition of the hand grip 28 and the spaced relationship therewith of the upwardly opening arm support 34 are such that the hand grip 28 may be conveniently and comfortably encircled by the palm 42 and fingers 44 of the user, while the hand 46, wrist 48 and forearm 50 of the user are maintained in axial alignment in the axial direction of the rod 13, that is to say that the hand, wrist and arm of the user are held in a straight line which is parallel to the longitudinal axis of the rod 13. Also the support 34 is engaged with the undersurface of the forearm 50 substantially intermediate the elbow and wrist of the user. When the arm is so held, the palm and fingers of the hand are disposed in a position in which they may encircle the hand grip 28 without any uncomfortable or inconvenient twist or bending being imparted to the wrist or the hand. In such position, maximum manipulating forces may be applied to the rod through the action of arm, wrist and hand muscles which are not distorted or unduly stretched by abnormal twisting or bending of these body parts, as is customary in holding and manipulating a rod when the handle of the rod is held while still maintaining the forearm in parallelism with the axis of the rod.

It will be observed from FIG. 1 that when the rod is held in the position illustrated while waiting for a fish to take the bait, the weight of the shaft 14 and any pull which may exist on the line provides a downward force on the end of the rod about the hand grip 28 or the user's hand, acting as a pivot point to thereby impart an upward force to the arm support 34 to keep the latter in firm engagement with the undersurface of the forearm 50. When a fish is hooked, and while it is being reeled in, the rod 13 may be easily and efficiently swung in a vertical plane by applying an upward force to the hand grip 28, which overcomes the downward force acting on the end of the rod and also continues to maintain the arm support in engagement with the forearm undersurface. The end of the rod is thereby prevented from slipping off the user's forearm during such manipulation.

A feature of this embodiment of the invention is that of providing the body portion opening or recess 40 for access to the conventional reel clamping sleeves 18 and 20 and of disposing the hand grip 28 and arm support 34 respectively forwardly and rearwardly of the reel 16. In this manner, while the rod is being swung upwardly while hooking and reeling in a fish, the reel 16 traverses a relatively short arc since it is as close as possible to the user's elbow.

Referring now to FIG. 6, there is illustrated another embodiment of the invention in which the holding device 110 is formed integrally with the rod handle 112, with further provision for removably connecting different lengths or styles of shafts 114 which, with the rod handle 112, makes up the entire fishing rod 113. In this embodiment, the body portion 124 is formed as a solid member with an arm support 134 attached thereto as by the screw 135 illustrated in FIG. 8, and provides an upwardly opening arm supporting recess 136. The hand grip 128 is formed integrally with the body portion 124 adjacent the forward end of the latter and extends upwardly and forwardly in the manner as described above, and is integrally joined with, or may be removably connected to, the rear end of the handle 112. Again it will be noticed that the hand grip 128 and the arm support 134 are disposed in spaced relationship such that the hand grip is conveniently grasped while the forearm, wrist and hand of the user are disposed in substantial parallelism with the axis of the rod 113, and with the support 134 disposed substantially intermediate the wrist and elbow of the user.

The handle 112 may be provided with suitable clamping means for removably holding a shaft 114. As illustrated in FIG. 9, one form of such clamping means comprises a chuck 160 which receives the rear end of the shaft 114 and a clamping sleeve 162 having threaded engagement with the end of the rod handle 112 and having a camming surface 164 for engagement with the forward end of the chuck fingers to releasably clamp the latter around the rear end of the shaft 114. By joining the holding device 110 to the rear end of the rod handle 112, the former does not interfere with mounting of the reel 116 by means of bracket 122 and sleeves 118 and 120 onto the handle 112 of the rod.

However, the main advantage of this embodiment of the invention is that there is a better distribution of weight both above and below the axes of the forearm and hand than in the previous embodiment where all of the weight is below the forearm, and for this reason some persons may find it easier to pivot or snap the rod 113 about the wrist for casting purposes. The fact that the arm support 134 does not completely encircle the arm greatly facilitates casting by a snap action of the rod from the wrist. On the other hand, those who cast with a swinging motion of the entire forearm may find the embodiment of FIG. 1 more convenient since the coaxial distribution of weight will tend to move toward keeping the arm support in engagement with the undersurface of the forearm during the casting movement of the rod.

A feature of the invention is illustrated in FIG. 10 wherein the holding device is collapsible to facilitate packaging and/or carrying when the device is not in use, as well as providing for adjustability of the hand grip 228 in relation to the axial direction of the body portion 224 so that the user may adjust the angular position of the hand grip 228 to suit his comfort or convenience. Thus the hand grip 228 is connected to the handle 212 and to the body portion 224 by clamping means 270 and 272, respectively, which may take the form of bolts and wing nuts or other suitable arrangement. By loosening the screws 270 and 272, the device can be collapsed so that all parts thereof are coaxial, or the angular disposition of the hand grip 228 relative to the body portion 224 may be changed while still maintaining parallelism between the body portion 224 and the axis of the rod so that axial alignment of the arm, wrist and hand of the user will still be maintained when the device is in use.

In connection with this feature of the invention, it should be noted that the hand grips 28 or 128 of the embodiments illustrated in FIGS. 1 and 6 could if desired, and within the scope of the invention, be modified to be adjustably connected to the body portions 24 or 124 in order to provide the same carrying and adjustability advantages as that provided in the construction illustrated in FIG. 10.

While the ear portions 38a and 38b are shown as encircling the end of the rod handle 12, it should be understood that they need not do so so long as portions of the ears extend on both sides of the handle.

It is to be understood that the embodiments of the invention described and shown herein are merely illustrative of the principles of this invention and more susceptible to modification of form, size, construction and arrangement of parts, the invention being intended to encompass all such modifications and alterations of the herein disclosed embodiments as may be deemed to be within the scope of the appended claims.

What I claim is:

1. For use with a fishing rod having a coaxial shaft and handle, a handling means comprising: a body portion, a hand grip disposed forwardly of said body portion and projecting radially upwardly from said body portion in a position convenient for palm and finger encirclement by the user, with the forearm, wrist and hand of the user extending in substantial parallelism with the axis of the rod, support means disposed rearwardly of said body portion shaped to receive and partially embrace the undersurface of the forearm of the user and positioned to be continuously urged thereagainst by an upward force about the user's hand as a pivot point and responsive to the weight of the rod or a downward pull on the forward end of the rod thereby preventing the rear end of the rod from slipping off the user's arm while the user's forearm, wrist and hand are maintained in said parallelism with the axis of the rod, means for mounting said body portion on the handle of the rod in position to have said body portion coaxial with the axis of the rod, said mounting means comprising split sleeve sections of the body having generally circular half sections adapted to fit around and receive within them the handle of the rod, said mounting means including means for releasably clamping said sleeve sections together, and said sleeve sections having portions cut away to conjointly define a downwardly opening recess to expose therethrough, for manual access, conventional means on the rod handle for securing a reel to the underside of the handle.

2. A device as set forth in claim 1 wherein said hand grip and said support means are each formed as half sections integral with the corresponding sections of said split sleeve, and including means for releasably securing said hand grip sections and said support means sections together.

3. For use with a fishing rod having a coaxial shaft and handle, a handling means comprising: a body portion, a hand grip disposed forwardly of said body portion and projecting radially upwardly from said body portion in a position convenient for palm and finger encirclement by the user, with the forearm, wrist and hand of the user extending in substantial parallelism with the axis of the rod, support means disposed rearwardly of said body portion shaped to receive and partially embrace the undersurface of the forearm of the user and positioned to be continuously urged thereagainst by an upward force about the user's hand as a pivot point and responsive to the weight of the rod or a downward pull on the forward end of the rod thereby preventing the rear end of the rod from slipping off the user's arm while the user's forearm, wrist and hand are maintained in said parallelism with the axis of the rod, means for connecting said handling means to a rod, and means for adjustably connecting the hand grip relative to the body portion to alter the upwardly projecting angular relationship of the hand grip to the body portion.

References Cited

UNITED STATES PATENTS

| 980,942 | 1/1911 | Hanson | 43—23 |
| 2,149,837 | 3/1939 | Browne | 43—23 |
| 2,283,816 | 5/1942 | Loutrel | 43—23 |

FOREIGN PATENTS 20,882
of 1896 Great Britain.

SAMUEL KOREN, *Primary Examiner.*

D. J. LEACH, *Assistant Examiner.*